United States Patent
Zazovsky et al.

(10) Patent No.: US 9,151,415 B2
(45) Date of Patent: Oct. 6, 2015

(54) METHOD AND APPARATUS FOR REDUCING FLUID FLOW FRICTION IN A PIPE

(71) Applicants: Alexander Zazovsky, Houston, TX (US); Luis Phillipe Costa Ferreira Tosi, Houston, TX (US); Seth Thomas Taylor, Fullerton, CA (US); Andres Zoldi, Houston, TX (US); Grzegorz Jan Kusinski, Moraga, CA (US); Leslie Douglas Munson, Houston, TX (US)

(72) Inventors: Alexander Zazovsky, Houston, TX (US); Luis Phillipe Costa Ferreira Tosi, Houston, TX (US); Seth Thomas Taylor, Fullerton, CA (US); Andres Zoldi, Houston, TX (US); Grzegorz Jan Kusinski, Moraga, CA (US); Leslie Douglas Munson, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 214 days.

(21) Appl. No.: 13/785,982

(22) Filed: Mar. 5, 2013

(65) Prior Publication Data
US 2014/0020783 A1    Jan. 23, 2014

Related U.S. Application Data

(60) Provisional application No. 61/672,485, filed on Jul. 17, 2012.

(51) Int. Cl.
*F15D 1/04* (2006.01)
*F16L 9/00* (2006.01)
*F17D 1/16* (2006.01)

(52) U.S. Cl.
CPC .... *F16L 9/00* (2013.01); *F17D 1/16* (2013.01)

(58) Field of Classification Search
CPC ............. F15D 1/02; F15D 1/06; F15D 1/065; F16L 9/00; F16L 9/006; F16L 9/14; F16L 11/12; F16L 11/121; F16L 58/02; F17D 1/16
USPC ......................................................... 138/39
See application file for complete search history.

(56) References Cited

U.S. PATENT DOCUMENTS

| 630,605 | A | * | 8/1899 | Gordon et al. | 138/39 |
| 3,175,571 | A | * | 3/1965 | Bankert | 137/111 |
| 3,464,740 | A | * | 9/1969 | McIver et al. | 406/191 |

(Continued)

FOREIGN PATENT DOCUMENTS

| DE | 9101324 | 4/1991 |
| EP | 1269935 | 1/2003 |

(Continued)

OTHER PUBLICATIONS

International Search Report for PCT/US2013/045564 dated Nov. 15, 2013.

(Continued)

*Primary Examiner* — Patrick M Buechner
(74) *Attorney, Agent, or Firm* — John E. Vick

(57) ABSTRACT

A tubular pipe adapted for transporting oil and water may be treated upon its interior surface to reduce frictional pressure of a multiphase oil/water mixture flowing through the pipe. The tubular pipe may have an interior wall and a central cavity. In some instances, the interior surface is provided with a first textured region being adapted for reducing the adhesive forces of transported oil along the interior wall. A second region upon the interior wall may be adapted for reducing the adhesive forces of water along the interior wall of the tubular pipe. In some applications, riblets may be provided upon the interior pipe wall to further reduce the frictional forces of fluid flowing through the central cavity of the pipe.

10 Claims, 6 Drawing Sheets

(56) References Cited

U.S. PATENT DOCUMENTS

| | | | |
|---|---|---|---|
| 3,943,060 A * | 3/1976 | Martin et al. | 507/225 |
| 4,100,967 A * | 7/1978 | Allen et al. | 166/68 |
| 4,621,953 A * | 11/1986 | McGuth | 406/193 |
| 5,678,609 A * | 10/1997 | Washburn | 138/107 |
| 5,880,233 A * | 3/1999 | Deckers et al. | 526/228 |
| 2002/0106506 A1* | 8/2002 | Kumano et al. | 428/343 |
| 2002/0175972 A1* | 11/2002 | Sanada | 347/47 |
| 2005/0241605 A1* | 11/2005 | Bedwell et al. | 123/184.21 |
| 2009/0260702 A1* | 10/2009 | Kim et al. | 138/39 |
| 2010/0206553 A1* | 8/2010 | Bailey et al. | 166/244.1 |
| 2013/0125992 A1* | 5/2013 | Krautschick et al. | 137/1 |
| 2014/0020783 A1* | 1/2014 | Zazovsky et al. | 138/141 |
| 2014/0158516 A1* | 6/2014 | Landrok | 203/10 |

FOREIGN PATENT DOCUMENTS

| | | |
|---|---|---|
| GB | 2435805 | 3/2010 |
| WO | 2004/083706 | 9/2004 |
| WO | 2010/077464 | 7/2010 |

OTHER PUBLICATIONS

Wenzel, Robert N., Resistance of Solid Surfaces to Wetting by Water, Aug. 1936, Industrial and Engineering Chemistry, vol. 28, No. 8, pp. 988-994.

Bannwart et al., Flow Patterns in Heavy Crude Oil-Water Flow, Sep. 2004, Journal of Energy Resources Technology, vol. 126, pp. 184-189.

Gogte et al., Effective slip on textured superhydrophobic surfaces, 2005, Physics of Fluids, vol. 17, 051701, American Institute of Physics, 4 pages.

Zheng et al., Effects of Hydraulic Pressure on the Stability and Transition of Wetting Modes of Superhydrophobic Surfaces, Oct. 6, 2005, Langmuir, vol. 21 pp. 12207-12212.

Fukagata et al., A theoretical prediction of friction drag reduction in turbulent flow by superhydrophobic surfaces, Apr. 20, 2006, Phys. Fluids, vol. 18, 051703, 8 pages.

Voronov et al., Review of Fluid Slip over Superhydrophobic Surfaces and Its Dependence on the Contact Angle, Mar. 25, 2008, Ind. Eng. Chem. Res. 47, pp. 2455-2477.

Paso et al., Novel Surfaces with Applicability for Preventing Wax Deposition: A Review, 2009, Journal of Dispersion Science and Technology, 757-781.

Daniello et al., Drag reduction in turbulent flows over superhydrophobic surfaces, 2009, Physics of Fluids, 21, 085103, 9 pages.

Ghosh et al., Review of oil water core annular flow, 2009, Renewable and Sustainable Energy Reviews, 13, pp. 1957-1965.

Rothstein, Jonathan P., Turbulent drag reduction using micro and nanotextured ultrahydrophobic surfaces, Jan. 27, 2010, Office of Naval Research, Contract No. N00014-06-1-0497, 17 pages.

Bhushan, Bharat, Biomimetics inspired surfaces for drag reduction and oleophobicity/philicity, Feb. 1, 2011, Beilstein Journal of Nanotechnology, 2, pp. 66-84.

Garcia-Mayoral et al., Drag reduction by riblets, 2011, Philisophical Transactions of the Royal Society, 369, pp. 1412-1427.

Wong et al, Bioinspired self-repairing slipperysurfaces with pressure-stab le omniphobicity, Sep. 22, 2011, Nature, vol. 477, pp. 443-447.

Min et al., Effects of hydrophobic surface on skin-friction drag, Jul. 2004, Phsics of Fluids, vol. 16, No. 7, 4 pages.

* cited by examiner

METHOD AND APPARATUS FOR REDUCING FLUID FLOW FRICTION IN A PIPE

CROSS-REFERENCE TO RELATED APPLICATION

This application claims priority to U.S. Provisional Application No. 61/672,485, entitled "Method and Apparatus For Reducing Fluid Flow Friction In A Pipe" filed on Jul. 17, 2012. The complete disclosure of the above-identified application is fully incorporated by reference.

FIELD OF THE INVENTION

The field of the invention is the flowing transport of multiphase oil/water mixtures in tubulars, pipes or pipelines.

BACKGROUND OF THE INVENTION

Oil and gas flow systems are required in the production of hydrocarbons. It is necessary to flow produced oil substantial distances from the point of production in a subterranean formation of a reservoir through production tubing to the top of a producing well. Once oil is produced from a well, it is sometimes necessary to move the oil a substantial distance through pipes or pipelines. Hydrocarbons, such as oil and gas, are produced with water in many instances. Thus, it is common to move oil and water together in a multiphase flow stream.

It is desirable to improve the flow performance of oil/water mixtures in pipes. The improvement in flow performance may reduce the energy lost in transporting such mixtures, enabling greater production from wellbores in some instances. In the case of pipelines, reducing the energy lost in transporting multiphase fluids through a pipeline is desirable.

Many surface modification techniques that are known for the interior of pipes are designed for the flow of a single phase of fluid through the pipe. This could be a single phase of water, or a single phase of a hydrocarbon, or another compound. However, the application of a surface modification technique that is designed for enabling reduced friction of flowing fluid of a single phase fluid does not address the problem of multiphase fluid flow. A surface modification technique that enables reduced friction for the flow of water is not likely to be as effective for the flow of a water/oil mixture. Likewise, a surface modification technique that enables the reduced friction flow of oil only also is not likely to be effective for the flow of an oil/water mixture.

In the production of hydrocarbons from subterranean wells, it is common for the early life of a well to produce substantially all hydrocarbons. However, later in the life of a well, a substantial amount of water is produced with the oil. Near the end of the life of a producing hydrocarbon well, the amount of water continues to increase, in many cases, to a point at which most of the produced fluid is water and the minority of the produced fluid is hydrocarbons. Thus, a strategy for reducing frictional flow of fluids from a well must take into account that the pipes or tubing installed as production tubing in a wellbore during well construction will encounter different proportions of oil to water during the production life of the well. The amount of water typically increases substantially during the producing life of the well. Further, it is likely to be uneconomical to replace production tubing during the life of a well. Therefore a need exists to provide a production tubing that is adapted to reduce the frictional flow of a multiphase flow that may be mostly hydrocarbons during the early life of the well and mostly water during the later life of the well.

It is generally desirable to reduce the kinetic energy lost in transporting multiphase oil/water mixtures in pipes and tubulars. The invention is directed to reducing frictional pressures in the transfer of oil/water mixtures in pipes, thereby conserving energy or maximizing production from a subterranean well.

BRIEF DESCRIPTION OF THE DRAWINGS

The drawings illustrate various aspects of the invention, wherein.

SUMMARY OF THE INVENTION

Figure 1A:
FIG. 1A shows schematically oleophobic fluid flow along an interior wall of a pipe.

A tubular pipe, system and method may be adapted for reducing the friction of multiphase oil/water mixtures flowing through the pipe. The pipe may comprise an interior wall and a central cavity. The pipe defines an axial direction along the length of the pipe. The interior wall comprises, in one embodiment: (a) a first textured region, the first textured region being adapted for reducing the adhesive forces of transported oil along the interior wall at the first textured region, and (b) a second textured region, the second textured region being adapted for reducing the adhesive forces of transported water along the interior wall at the second textured region.

In some instances, the first and second textured regions comprise first alternating bands of first textured regions and second textured regions upon the interior wall of the tubular pipe.

First alternating bands may be provided in the axial direction along the length of the tubular pipe, in some applications. First and second textured regions additionally may comprise second alternating bands of first textured regions and second textured regions upon the interior wall of the tubular pipe, wherein the second alternating bands are provided generally perpendicular to the axial direction of the pipe.

The first textured region may be coated with a hydrophilic coating, the first textured region having an affinity for water. The second textured region may be coated with a hydrophobic coating, causing the second textured region with coating having an affinity for oil. The first textured region is laminated, in some embodiments of the invention. The second textured region may be laminated in other embodiments of the invention.

In other applications of the invention, the first textured region and/or the second textured region may be laminated with a sacrificial layer.

In some applications, the interior wall of the pipe may include first riblets oriented along the axial direction of the pipe. The first riblets may be substantially parallel, and may be discontinuous or continuous along the axial direction of the pipe.

Second riblets may be oriented along the axial direction of the pipe in another aspect of the invention, the second riblets having a different average height as compared to the first riblets.

The first textured region may be formed by a spray deposition technique selected from the group of spray deposition techniques consisting of: thermal spray, cold spray, and plasma spray.

The first textured region may be formed by solution based deposition, the solution based deposition being selected from the group of: sol-gel processing and chemical solution deposition.

In another embodiment of the invention, the tubular pipe may include a first textured region and/or the second textured region that is plasma modified to impart roughness to the first textured region.

DETAILED DESCRIPTION

An apparatus and method of frictional pressure loss reduction in a turbulent multiphase pipe flow is described. The flowing fluid may be represented, for example, by oil, water, gas and their mixtures. A primary application of this invention is the improvement of flow performance of production tubing, water injectors, and surface or subsea pipelines during oil and gas reservoir development, upstream facilities, midstream pipelines, and downstream refineries. One manner in which improvement of flow performance may be achieved is by modifying the wetting properties of inner pipe wall surface, including topology modifications, in such a way that the inner pipe wall surface becomes repellent with respect to one or more flowing fluids thereby reducing the frictional forces as the flowing fluids travel through the pipe.

One application of the invention involves aperiodic surface structuring and two-fluid surface texturing. This approach is based on capturing and retention of additional (lubricating) fluid inside the microstructure of textured pipe wall surface. This lubricating fluid modifies wetting property of surface over a fraction of its area resulting in the overall reduction of adhesion of flowing and transported fluid to the pipe wall.

Another embodiment of the invention involves systematic (periodic or aperiodic) surface structuring. It is based on replicating as nearly as possible the "shark skin" structure of sharks by streamlining the flow in the boundary layer with riblets at the pipe wall oriented along the flow direction.

Slip may be achieved in some instances using super hydrophobic coatings. The "super" prefix is employed when the contact angle between the droplet of interest and surface is greater than 150°. However, to transition between hydrophobic and super hydrophobic for example, surface topology (i.e. a geometric pattern) may be useful along with the chemical characteristics to reduce the frictional forces. The added phobicity usually comes from the entrapment of the undesired phase, such as air, into the small pores (on the order of 10 µm) between the generated structures. Pores are entrapped with air and the water is only exposed and supported by the tips of the nano-structures or "pillars," which allow for the super contact angles. A strong correlation between the free-shear layer and percentage of free surface area (water area exposed to air rather than the surface) and drag reduction exists, suggesting that by increasing the effective area exposed to air increases the amount of drag reduction.

Microscale (on the order of up to about 130 µm) surface geometrical features have also been shown to reduce drag for a specific range of Reynolds numbers. Grooves (or "riblets") oriented in the direction of the flow decrease near wall turbulent effects, creating anisotropic roughness. The use of riblets, in one embodiment of the invention, reduces the effective momentum exchange between the wall and the flow above the grooves. The sizing and spacing of these riblet features are important in determining the optimal operation for drag reduction, but increase drag when Reynolds numbers diverge from the optimum design.

During deployment, oilfield production tubing will encounter continuous mechanical trials, including impact from the outside and the inside, experience handling wear near threads, humidity changes, and wide temperature swings, ranging from water freezing and near boiling temperatures. Installation exposes the inside of the tubing to similar impact trials, with added stress/strain on tubing during installation placement in the wellbore at reservoir temperatures and pressures. Drilling mud, brines (i.e. KCl, NaCl, etc.), acid (i.e. 15% HCl), and high particle concentration fluids (gravel/fracturing fluids) will may come in contact with tubing internal diameter during completion and reservoir stimulation operations.

The apparatus, system and method proposed by the invention overcome limitations in part by multiple fluid surface texturing. The proposed method allows for creating textured surfaces with the anti-sticking properties for multiple immiscible fluids and their mixtures over different fractions of surface area of the interior wall of pipe.

These fractions of surface area may be periodically or aperiodically engineered at the microscale. By "microscale", it is meant surface deviations that alter a smooth wall surface, with the surface deviations being in the range of about 0.1 to about 130 micrometers in size.

The application of the apparatus and method of the invention to pipe flow in the oil industry should provide benefits of friction pressure reduction in those cases in which the composition or phase behavior of fluids flowing, produced or transported in pipe vary with time in the course of a technology cycle.

Frictional pressure losses in turbulent pipe flow are controlled by the flow rate, the pipe wall roughness, and the wettability (or surface energy) of its surface. Wettability typically is usually excluded from the list of parameters by considering standard pipes and fluids (for example, water flow in a metal pipe) or limiting analysis to those cases when the impact of flow velocity and pipe roughness is predominant.

Turning to the Figures, FIG. 1A illustrates a pipe having an oleophobic inner coating (hydrophilic coating) upon the surface 16 of the interior wall 18 of the pipe. The water 14 fraction flowing in the pipe has migrated towards the interior wall 18 of the pipe, away from the pipe midline. The oil 12 fraction has migrated towards the centerline of the pipe.

Figure 1B:
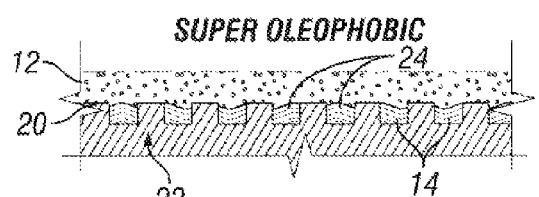
FIG. 1B shows a super oleophobic flow pattern with recesses/texturing in the interior wall of the pipe.

FIG. 1B shows a different pipe with an interior wall 22 having a surface 20 with a plurality of recessions 24 formed by texturing the surface 20. A super oleophobic coated textured surface causes hydrophilic forces to retain the water 14 within the recessions 24 in the textured and coated region of the surface 20. Oil 12 flows with less friction due to the boundary layer of water 14 that is adhered to the recessions 24.

Figure 2:
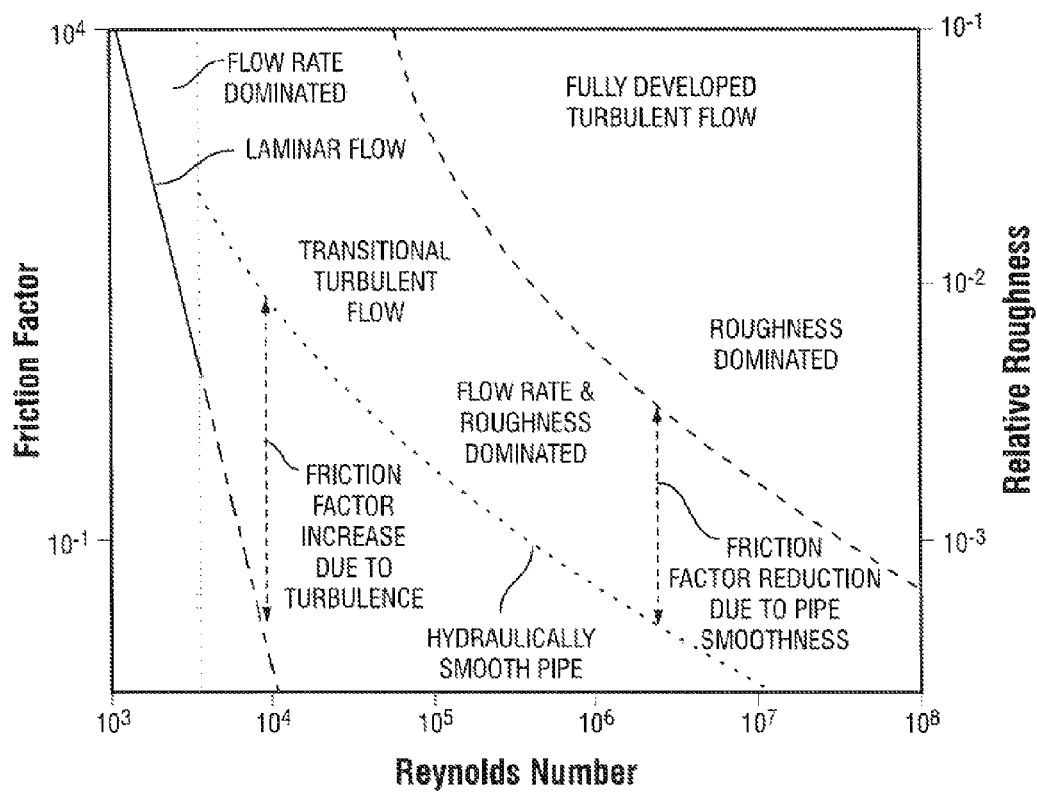
FIG. 2 is a graph showing relationships of friction factor, Reynolds number, and relative roughness.

A schematic map of flow regimes is shown in FIG. 2. The dashed line on the left is an extrapolation of the laminar linear law into the turbulent region, for visualizing the increase in the friction factor, which can be attributed to the flow turbulence. The curve in the middle and extending downward and to the right corresponds to the hydraulically smooth pipe envelope. The upper curve in FIG. 2 (to the right) is a boundary of fully developed turbulent flow. Thus, the vertical drop from the upper curve to the lower curve represents the improvement in friction factor reduction due to pipe smoothness that can be achieved by decreasing pipe wall roughness. The reduction of pipe flow friction below the smooth pipe limit (lower curve) is within the range of matching operational requirements, and is desirable.

For rough pipes, in which the surface roughness is comparable to within about two orders of magnitude of the laminar flow boundary-layer length scale, the pipe wall roughness is the dominant factor whereas the surface wettability contribution to the friction pressure becomes negligible. In fully developed turbulent pipe flow, the friction factor does not depend on flow velocity. The effect of wettability on the friction factor in fully developed turbulent flow is not quantified but should become negligible since the pipe wall roughness fully determines the boundary layer structure.

With decreasing pipe roughness, however, as one approaches microscale effects, the effect of pipe wall wettability is more pronounced since the impact of roughness on the flow regime inside the boundary layer becomes less important. Methods for reducing the frictional pressure loss in pipe flow below the smooth pipe limit include: adding small amounts of high-molecular weight substances such as soaps and soluble polymers to flowing liquids; injecting lubricating fluids reducing wall friction into pipe flow; reducing wettability of pipe wall with respect to the flowing fluid by coating the surface with appropriate materials or/and chemical treatment; texturing pipe wall surfaces and making it capable of attracting and trapping a second fluid into its surface structure.

Texturing can create an effective slip layer at a fraction of pipe wall surface. Patterning pipe walls with riblets oriented along the flow direction and streamlining flow inside the boundary layer also may be useful in the practice of the invention, in addition to texturing.

The invention comprises, in one embodiment, the use of technologies of pipe wall surface modification including coating, texturing and/or patterning at microscale in various combinations to achieve a desired impact, with a primary focus upon friction reduction in multiphase pipe flow.

The solutions proposed in this invention may include surface texturing allowing for entrapment of one or more lubricating fluids inside surface sub-structures, or patterning a pipe wall with riblets oriented along the flow direction to streamline flow inside the boundary layer, or both.

In one embodiment this could be comprised of multiple types of riblets, each of which promotes wall-slip for a specific kind of fluid. Also, it is possible to combine surface coating and/or chemical treatment with patterning at microscale by riblets or similar regular asperity members to promote streamlining via wall-slip. In other instances, it may be desirable to combine surface texturing with patterning at microscale by riblets. In yet other embodiments, it may be desirable to combine coating and/or chemical treatment with surface texturing. In yet other embodiment, one may create laminated surface coating or texturing to achieve sub-structuring by active or passive surface re- or post-processing, with partial surface layer removal at a fraction of surface area.

One embodiment of the invention may involve creating sacrificial layers in laminated surface coating/texturing allowing for gradual surface property (surface energy with respect to different fluids) modification in the course of pipe usage. Another possibility includes laminated coating or/and surface chemical treatment/texturing with near-surface streamlining by riblets. In yet another embodiment of the invention, it may be possible to apply surface coating/texturing with anti-fouling capabilities. Anti-fouling properties may be considered here as an attribute (secondary property) of modified surface matching operational requirement.

The available means for friction reduction breaks down into two major groups: (1) first, methods based on modification of surface wettability (energy, sticking potential) by coating, chemical treatment, texturing with entrapment of lubricating fluids and their combinations; and (2) methods of flow streamlining near the pipe wall by patterning at microscale with riblets or similar types of controlled regular asperities.

The surface modification methods of the first group (1) are sensitive to the wettability properties of flowing fluid with respect to the pipe wall and therefore may be impacted by the fluid phase behavior and composition. In contrast, the methods of Group (2) do not depend of the wettability properties of flowing fluids and therefore may be expected to perform better with multiphase fluids of variable composition and at different multiphase flow regimes (dispersed flow, stratified flow, slug flow, and the like). This is the reason that the combination of methods from these two groups may provide additional synergy with respect to friction reduction in multiphase pipe flow.

Figure 3:
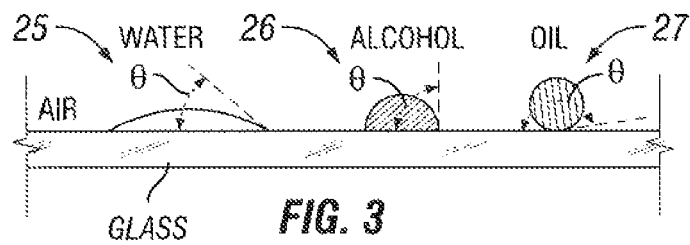
FIG. 3 illustrates wettability.

The effect of wettability on interaction of fluid droplets with a hydrophilic surface (glass) is illustrated in FIG. 3. Water 25 is shown to the left, alcohol 26 in the middle, and oil 27 on the right of FIG. 3. The wettability controls the shape of droplets and their contact areas. It is characterized by the contact (or wetting) angle, which varies. The wettability may be correlated with the fluid sticking potential to the surface. The fluid-surface interaction impacts the flow structure inside the near wall boundary layer. The sticking capability of water with respect to glass usually results in the no-slip boundary condition for flow near the surface, i.e. the flow velocity at the pipe wall becomes equal to zero. This mechanism is the main cause of viscous friction inside the turbulent boundary layer, but not the only cause. Additional friction and energy dissipation is induced due to flow turbulence.

An oleophobic surface (glass in contact with oil) repels adjacent fluid. For a perfectly oleophobic situation, the flow velocity at the smooth pipe wall approaches the mean velocity and the velocity profile is uniform across the pipe flow area.

In the case of intermediate wettability, due to continuity considerations, the wall-slip varies from zero to its maximum value but the correlation between the contact angle and the dimensionless velocity at the pipe wall is unknown. A frequent speculation is that there is no wall-slip in a hydrophilic case.

Figure 4A:
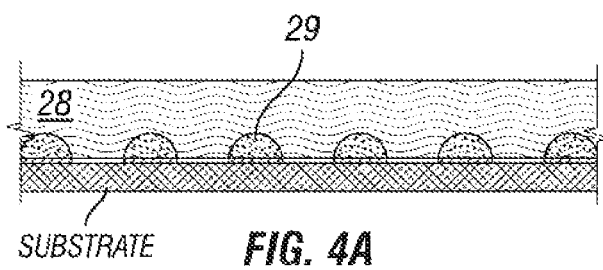
FIGS. 4A-4B show a mixed wettability coating.
Figure 4B:
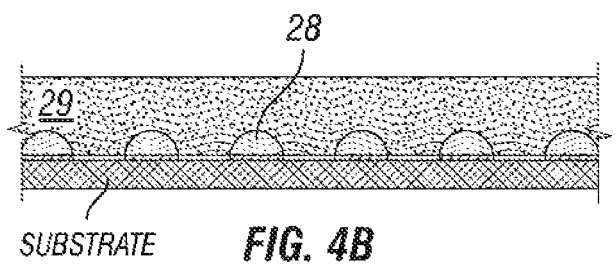

A few examples of surface modification are shown. A mixed wettability coating is shown schematically in FIGS. 4A-4B, without texturing on the surface of the substrate. The surface is covered by two coating materials with different wettability. A coating (top structure) is hydrophilic with respect to Fluid 1 (numeral 28) and hydrophobic with respect to Fluid 2 (numeral 29), and thus Fluid 1 is adhered to the substrate, while Fluid 2 forms discrete droplets. This type of coating may retain wetting fluid at the part of its surface area after replacement of one fluid inside the volume adjacent to the surface by another fluid. The lower structure shows the other case in which the substrate has affinity for Fluid 2, but repels Fluid 1. The main issue, however, with this type of coating is related to the fact that, at high enough flow rate along the surface, the retained wetting fluid will be removed by flow shearing reducing its lubricating effect. This is due to the Kevin-Helmholtz instability, and represents a problem since surface tension (stabilizing factor) and turbulence (destabilizing factor) fight to keep the fluid or push it out. Thus, the boundary is unstable, and the wetting fluid cannot remain on the surface as a friction reduction mechanism.

Figure 5A:
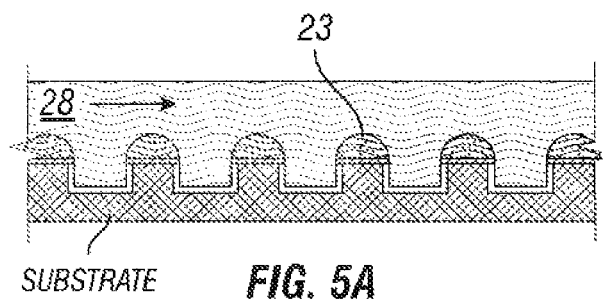
FIGS. 5A-5B illustrate a mixed wettability coating with texturing.
Figure 5B:
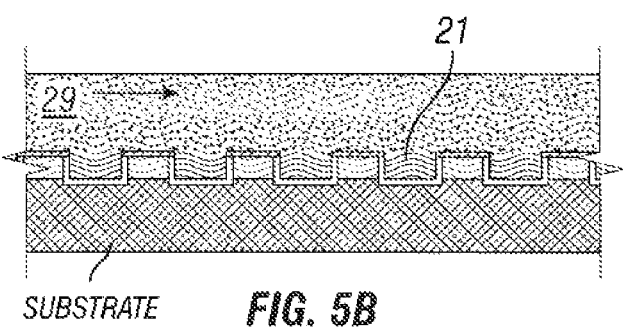

More efficient surface modification can be achieved by surface texturing shown schematically in FIGS. 5A-5B. The roughness created by texturing should be small enough to not trigger the pipe flow regime dominated by roughness, i.e. preserving pipe smoothness. Depending on wettability of surface level elevations and recessions, then two basic scenarios can be anticipated, which are shown at FIGS. 5A-5B. At the top example in FIG. 5A, Fluid 1 (numeral 28) and Fluid 2 (numeral 29) is shown. The lubricating Fluid 2 (numeral 23) is entrapped at elevations; at the bottom example in FIG. B, the lubrication Fluid 1 (numeral 21) is entrapped at recessions. In FIG. 5A, the lubrication will be inefficient because the lubricating fluid will be washed out from the surface by flow shearing. In contrast, the lubrication fluid will be preserved in the structure shown in FIG. 5B, being protected by elevations from washing out. This illustrates the advantages of surface texturing.

The actual geometry, structure and distribution of elevations and recessions over the pipe wall surface can vary. It can be regular and symmetrical as well as irregular and asymmetrical in terms of both the pattern distribution over the surface and the shapes of elevations and recessions.

Figure 6A:
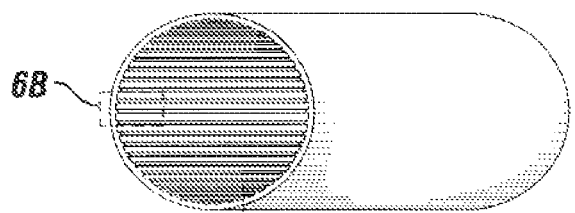
FIGS. 6A-6C illustrate riblets upon the interior wall of a pipe.
Figure 6B:
Figure 6C:
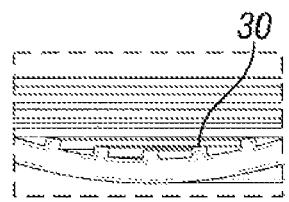

A pipe with riblets covering its wall is shown schematically in FIGS. 6A-C. The riblets 30 are oriented along the flow direction (pipe axis) and serve for the streamlining and stabilization of the viscous sub-layer of turbulent boundary layer. The riblets imitate in some sense the structure of shark skin with its capability of drag reduction. The riblets can be continuous, discontinuous, regular or irregular (in terms of size, spacing and geometry) but typically they are oriented in the direction of mean flow, i.e. along the pipe axis.

The riblets 30 are streamlining components of surface structure. They reduce the pulsation energy exchange between the sub-layers of turbulent boundary layer, i.e. in the transversal direction with respect to pipe wall. The size of riblets 30 may be in the range of about 15 to about 130 micrometers, and in other applications, from about 15 to about 700 micrometers. Riblet size will be dictated by the application, and the fluids employed. Further, riblets may be introduced or formed at multiple length scales, and with more than one type of geometry or cross-sectional shape or aspect ratio.

Figure 7A:
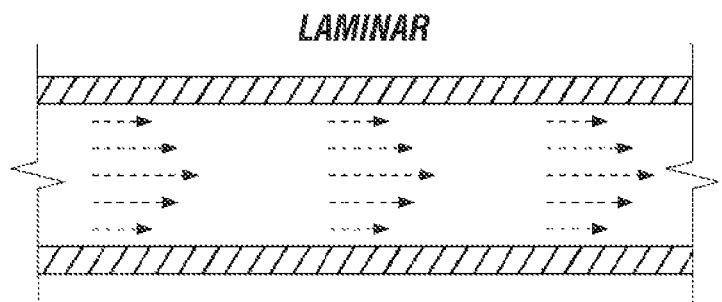
FIGS. 7A-7C reveal laminar and turbulent flow profiles.
Figure 7B:
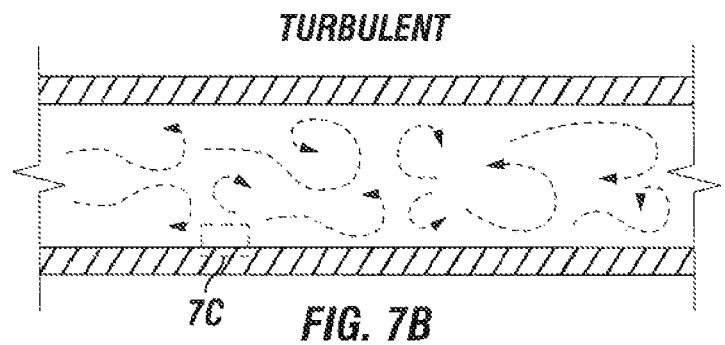
Figure 7C:
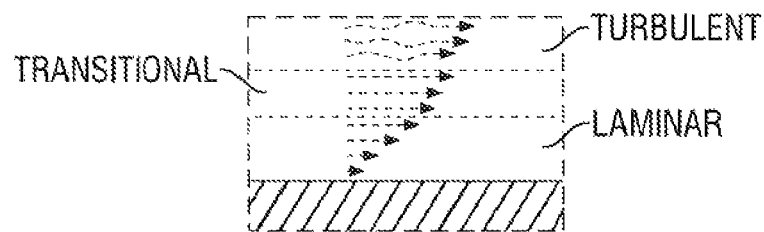

FIGS. 7A-C show schematically the laminar flow regime, the turbulent flow regime, and the boundary layer in the turbulent flow regime, which has components of laminar flow, transitional flow, and turbulent flow.

Figure 8:
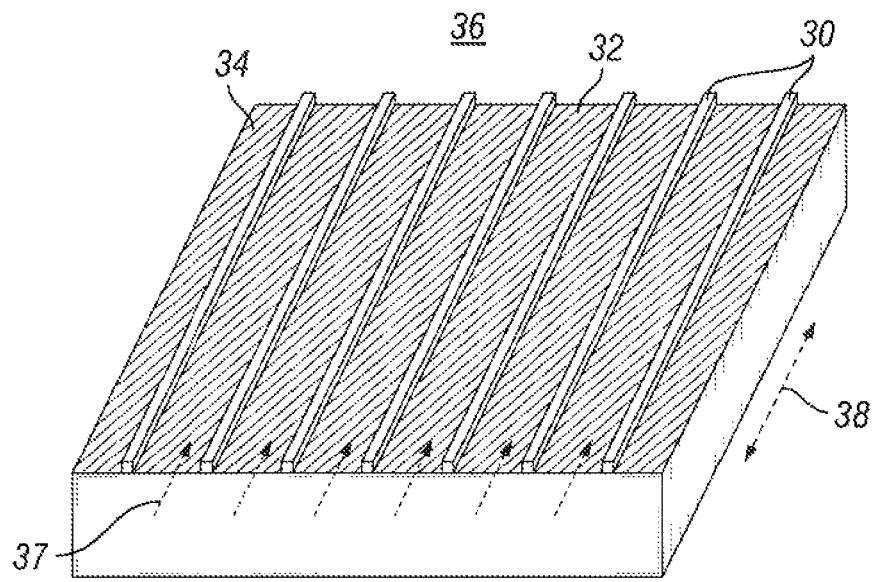
FIG. 8 shows a first embodiment of the invention.

A pipe wall containing riblets and purposefully-introduced texture is shown in FIG. 8. A first textured region 32 upon interior wall 34 of the central cavity 36 is shown. Axial direction 38 of the pipe interior wall 34 is shown, running in the same direction as the fluid flow direction 37. The first textured region 32 is adapted for reducing the adhesive forces of transported oil along the interior wall at the first textured region 32. However, there is no second textured region in the structure of FIG. 8, as the pipe interior wall 34 has only the one type of texturing, shown by first textured region 32. Riblets 30 are shown.

Figure 9:
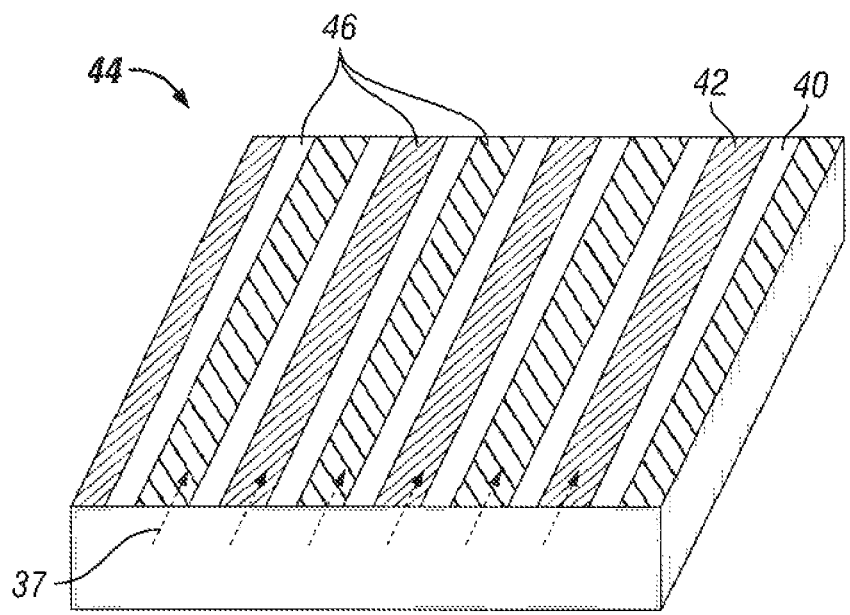
FIG. 9 shows another embodiment of the invention.

A multi-patterned textured pipe wall 44 is shown in FIG. 9. For simplicity, two shown texturing patterns are arranged in a regular way. They can be arranged arbitrary in an irregular way as well, in other embodiments of the invention. A first textured region 40 (providing reduced oil flow friction) and a second textured region 42 (providing reduced water flow friction) are shown. The first textured region 40 and second textured region 42 are provided in first alternating bands 46 in the direction of fluid flow 37.

Figure 10:
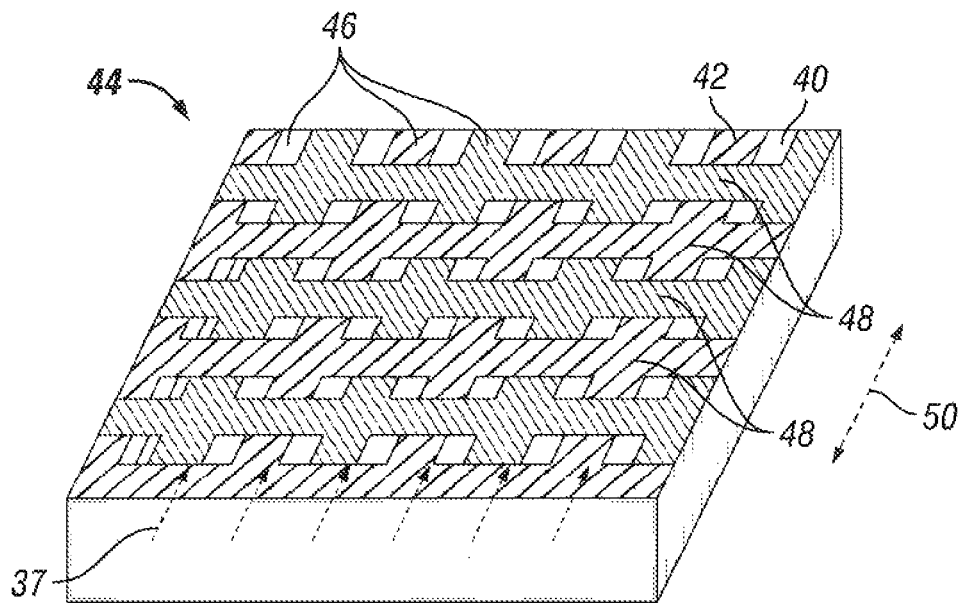
FIG. 10 shows yet another embodiment of the invention.

Overlapping texturing patterns are shown in FIG. 10. They also may be arranged in an irregular manner. On the interior wall 44, a first textured region 40 (providing reduced oil flow friction) and a second textured region 42 (providing reduced water flow friction) are shown. The first textured region 40 and second textured region 42 are provided in first alternating bands 46 in the direction of fluid flow 37. A second alternating band 48 is shown roughly perpendicular to the first alternating band 46. Axial direction 50 is shown. Of course, it is recognized that the respective first and second textured regions 40, 42 may be provided in a chaotic (random) or uneven manner as well, and the proportion of each as a percentage of the overall wall area may be adjusted to fit the particular application, and the anticipated oil/water content of the multiphase fluid flow.

Figure 11:
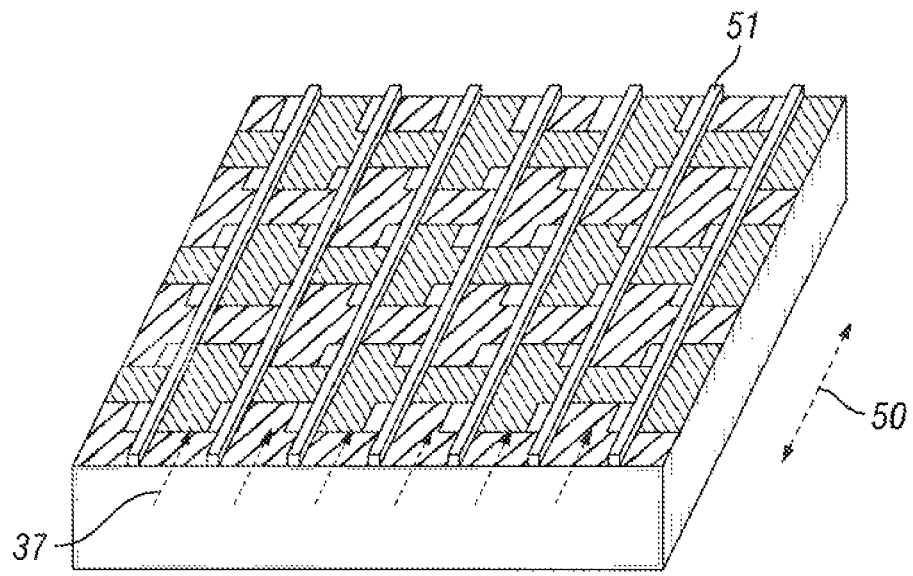
FIG. 11 illustrates another embodiment of the invention.

The combination of multi-patterned texturing with riblets 51 is shown in FIG. 11. In that FIG. 11, an embodiment substantially like that of FIG. 10 is provided, but with riblets 51 provided along the axial direction 50.

Figure 12:
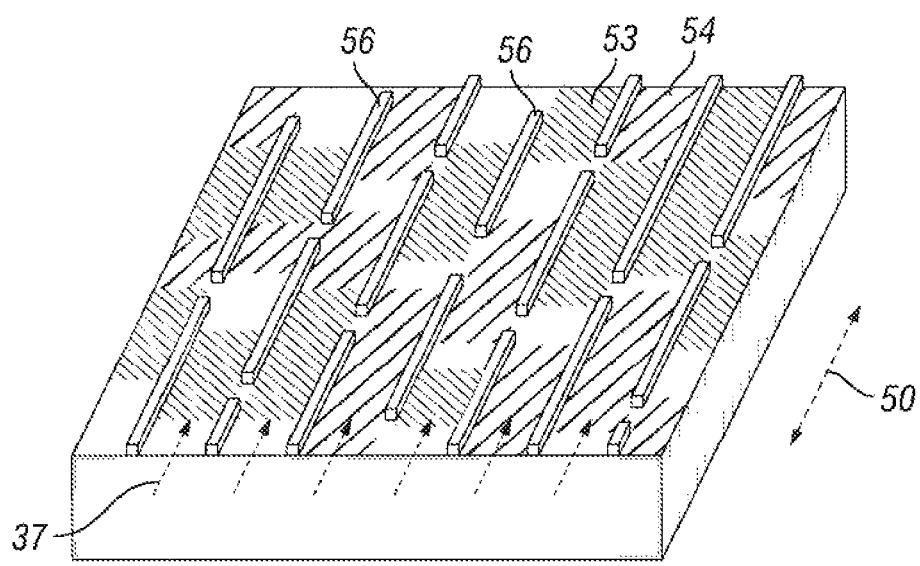
FIG. 12 shows another embodiment of the invention.

FIG. 12 shows an alternate embodiment similar to that of FIG. 11, but with chaotic (i.e. random) first textured regions 53 and chaotic (random) second textured regions 54. Further, a discontinuous riblet 56 pattern is used, in which riblets 56 are not continuous, but still are provided in the axial direction 50. In some applications, discontinuous riblets 56 may provide the most effective friction reduction for flowing fluids. In some embodiments, riblets may be provided with more than one spacing or geometry or size or aspect ratio.

In some applications, spray deposition techniques (thermal spray, cold spray, arc plasma spray, vacuum plasma spray and the like) may be deployed to impart a textured surface or textured coating to the pipe wall. These spray techniques rely on kinetic processes to deposit liquid and particle feedstocks onto a surface, resulting in surfaces with controlled composition and roughness, both of which can be tuned through control of processing parameters and feedstock material(s).

In some applications, optical techniques such as pulsed-laser ablation, laser machining, or laser etching can be used to purposefully introduce surface roughness or texture to the pipe wall. In these approaches, focused light is utilized to remove, ablate, shape, or otherwise modify a surface to control its texture and roughness.

In other applications, chemical etching can be used to introduce surface roughness or texture. This might involve acids, bases and other caustics to intentionally remove material. Patterned riblets could be introduced after controlled etching of the pipe wall, for instance.

In other applications, stamping, imprinting and other mechanical lithography techniques may be used to introduce controlled surface textures and surface patterns, including riblet structures and other periodic features.

Forging and other deformation-based techniques also may be used to introduce regular or irregular surface features on a pipe wall or surface.

In other applications, plasma modification of surfaces before or after coating deposition may be employed to impart engineered roughness and controlled surface texturing.

In other applications, a solution-based deposition technique such as sol-gel processing and chemical solution deposition may be employed to achieve texturing, or in some cases, to achieve riblets or micro-patterned surface structures or asperities. Nanoparticles can be added to these solution-based deposition techniques to allow for greater control of surface roughness and texturing, in one application of the invention.

In other applications of the invention, riblets and other patterned surface features may be introduced by direct writing and other three-dimensional printing (or additive manufacturing) technologies. These include, but are not limited to, additive particle processes that utilize focused light to sinter fine particles into a solid structure at high spatial resolution (from tens of nanometers to higher dimensions). The fine particles can be metallic, or ceramic, or semiconducting, or polymeric, or biological in nature.

Combinations of any of these techniques may be employed to control, introduce, and otherwise manipulate surface texture, surface roughness, and engineered surface structures.

In some cases, a coating may be deployed upon the interior wall of the tubular pipe, to minimize corrosion (H2S, CO2, aqueous O2), chemical exposure, abrasion, impact, and rapid-decompression. Further, such a coating should be able to maintain structural integrity including stress and strain seen by the tubing string; and maintain the functional requirements over the life of the well.

A coating can be introduce through a variety of different deposition techniques, including vapor-based deposition techniques (physical, chemical, and variants thereof); spray-based deposition techniques (as discussed above); solution-based deposition techniques, including electrochemical-based approaches as well as liquid-derived coatings, The coatings can be incorporated to impart unique surface functionality, such as engineered wettability, controlled surface energy, tailored friction coefficient, or the like; or can be utilized to protect the underlying material or substrate. Aid coating(s) can be organic (polymeric) or inorganic (metallic or ceramic or semiconducting or some combination thereof) in nature.

Operating parameters may vary. An example of typical values are:

Temperature (BHST) as much as 300 degrees F.;
Reservoir Pressure as much as 20,000 psi;
Fluid density about 30 to about 45 API;
Fluid viscosity, about 1.4 to about 4.7 cP;
H2S Content, greater than about 10% in some instances;
CO2 Content, greater than about 10% in some instances; and
Chloride Content, about 100,000 ppm.

A desirable drag reduction for the coating may be between 0% and 8% reduction in drag below the Colebrook hydraulically smooth pipe limit. However, a reduction greater than 8% could be desirable as well. The most desirable anti-fouling properties for the coating are such that accumulated deposits do not affect overall drag reduction performance of the pipe and remain "invisible" to the flow. Specifically, shear stresses associated with the removal of deposits must be less than wall shear stresses achieved in the engineering flow.

The desired corrosion properties for the coating are those of high resistance to H2S and CO2 partial pressures, as well as resistance to water with high chloride content and oxygen content. The coating is not required to support the substrate (tubing internal diameter) as a corrosion barrier, but rather should survive as long as the substrate survives in a similar environment. Corrosive environment wells requiring corrosion resistant alloys (CRAs) may be coated to address drag and deposition issues. The coating, in turn, must survive the environment to the extent necessary to sustain the functional requirements.

The mechanical properties required to support mechanical wear, erosion, rapid decompression, substrate adherence strength, structural integrity (flexibility), and impact resistance are relative to the baselines for each individual coating type and next best alternative. The coating must be resistant enough to survive the mechanical trials and exposures during the life of the well at temperature and pressure.

A coating should possess chemical properties to support the compatibility with fluids that may be used in the wellbore at any time during the life of the well, including drilling mud, completion brines, acids, and production fluids.

An example list of fluids that may be applied downhole during the life of a typical hydrocarbon producing well include: acids such as 15% HCl, brines such as CaCl2, KCl, NaCl, KBr, CaBr2, NaBr, ZnBr2, special chemicals such as CH3OH, drilling mud, including both oil based and water based drilling mud.

Application of the coating should be feasible for tubing internal diameters starting with 2.750 inches and least as large as 6.538 inches. Threaded end sections of tubing may need to be coated as well. The coating must also be able to be applied to the general class of steels, including corrosion resistant alloys with high chromium and nickel content. The coating should be able to be applied to tubing at least 31 feet in length. Coating materials must be readily available, such that large volumes of tubing (greater than 700 tubing joints) may be coated in a reasonable timeframe (generally, less than 6 months).

Materials applied as the coating may include any one or more of the following: fluoropolymers; namely, PTFE (polytetrafluoroethylene, Teflon™), PFA (perfluoroalkoxy polymer resin, also known as Teflon™), FEP (fluorinated ethylene-propylene, also known as Teflon™), ETFE, PVDF (Kynar™), TFE (trifluoroethanol), FPM, CTFE, FFKM (Kalrez™ Tecnoflon™ FFKM), FKM (Viton™, Tecnoflon™); thermoplastics, including: acrylonitrile butadiene styrene (ABS), styrene-acrylonitrile (SAN), polybutylene terephthalate (PBT), polyacrylates (acrylic), polyvinyl acetate (PVA), polyurethane (PU), polytrimethylene erephthalate (PTT), polyvinylidene chloride (PVDC), polyester, polypropylene (PP), polystyrene (PS), polyethylene (PE), polyphthalamide (PPA), polycarbonate (PC), polyetheretherketone (PEEK), polysulfone (PSU), polyacrylonitrile (PAN or Acrylonitrile), terephthalate (PCT), polychlorotrifluoroethylene (PCTFE), polyacetal (POM or Acetal), polycyclohexylene dimethylene, polyvinyl chloride (PVC), ionomers, polymethylpentene (PMP), polyphenylene sulfide (PPS), polylactic acid (PLA), polyethersulfone (PES), polybutadiene (PBD), polyimide (PI), fluoroplastics (PTFE, alongside with FEP, PFA, CTFE, ECTFE, ETFE), polyamide-imide (PAI), polyethylenechlorinates (PEC), polyetherimide (PEI), Polycaprolactone (PCL), polybutylene (PB), polyethylene terephthalate (PET), cycloolefin copolymer (COC), Kydex™, acrylic (PMMA), celluloid, cellulose acetate, ethylene vinyl alcohol (EVOH), ethylene-vinyl acetate (EVA), polyetherketoneketone (PEKK), polyphenylene oxide (PPO), polyaryletherketone (PAEK or Ketone), polyhydroxyalkanoates (PHAs), liquid crystal polymer (LCP), polyamide (PA or Nylon), polyketone (PK); and polymers including: poly p-methyl styrene, polyvinyledene fluoride, polybutylene, polycaprolactam, polyvinyl methyl ether, terephthalate, poly m-methyl styrene, hexamethylene dicarbamate, polytetrafluoro ethylene, polyether etone, polypropylene oxide, polystyrene, polyhexamethylene adipamide, poly p-phenylene erephthalamide, poly m-phenylene isophthalamide, polyethylene hexamethylene dicarbamate, polymethyl pentene, polypropylene, polypentamethylene, polyethylene terephthalate, polyurethane, polyphenylene oxide, polyhexamethylene sebacamide, polymethyl methacrylate, polyvinyl chloride, polycarbonate, poly p-phenylene sulphide, polyoxymethylene, polyetherimide, polyethyleneoxide, polyimide, polyethylene, polyethylenesulphide, poly isobutylene; metals and combinations of one or more metals and alloys.

The pattern of the coating applied may include any geometry that generates anisotropic turbulence such that the flow direction is favored, including microscale grooves or riblets oriented in the direction of the flow, U-shaped channels, V-shaped channels or Y-shaped channels, in some applications.

The coating deposition may be applied using any one of several application mechanisms, including, for example, chemical vapor deposition, electroplating, thermal spray, liquid coatings, fusion bonded epoxy coatings, application tapes, roll on tapes, photolithography, large scale self assembly, and micro-patterning.

In the practice of the invention, it may be possible to observe Darcy friction factors of about 0.01 to about 0.02. In other applications of the invention, it may be desirable and possible to decrease Darcy friction factors to about 0.009 and lower.

Other embodiments of the invention not specifically disclosed but within the scope of this disclosure also could be employed in the practice of the invention.

What we claim is:

1. A tubular pipe adapted for reducing the friction of multiphase oil/water mixtures flowing through the tubular pipe, the tubular pipe comprising an interior wall and a central cavity, the pipe defining an axial direction along the length of the pipe, the interior wall comprising:
   (a) a first textured region, the first textured region comprising a hydrophilic coating having an affinity for water, the hydrophilic coating being adapted for reducing the adhesive forces of transported oil along the interior wall at the first textured region,
   (b) a second textured region, the second textured region comprising a hydrophobic coating having an affinity for oil, the hydrophobic coating being adapted for reducing the adhesive forces of transported water along the interior wall at the second textured region, and
   (c) wherein the first and second textured regions comprise first alternating bands of first textured regions and second textured regions upon the interior wall of the tubular pipe.

2. The tubular pipe of claim 1 wherein the first alternating bands are provided in the axial direction along the length of the tubular pipe.

3. The tubular pipe of claim 2 wherein:
   the first and second textured regions additionally comprise second alternating bands of first textured regions and second textured regions upon the interior wall of the tubular pipe in a direction that is generally perpendicular to the axial direction of the pipe.

4. The tubular pipe of claim 1 wherein the interior wall of the pipe additionally comprises first riblets oriented in the axial direction of the pipe.

5. The tubular pipe of claim 4 wherein the first riblets are substantially parallel.

6. The tubular pipe of claim 4 wherein the interior wall of the pipe comprises second riblets oriented along the axial direction of the pipe, the second riblets having a different average height as compared to the average height of the first riblets.

7. The tubular pipe of claim 1 wherein the first textured region is laminated.

8. The tubular pipe of claim 7 wherein the first textured region is laminated with a sacrificial layer.

9. The tubular pipe of claim 7 wherein the second textured region is laminated.

10. The tubular pipe of claim 9 wherein the second textured region is laminated with a sacrificial layer.

* * * * *